(12) United States Patent
Bent et al.

(10) Patent No.: US 7,933,821 B1
(45) Date of Patent: *Apr. 26, 2011

(54) SYSTEMS AND METHODS FOR ADMINISTERING RETURN SWEEP ACCOUNTS

(75) Inventors: Bruce Bent, Manhasset, NY (US);
Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/385,522

(22) Filed: Apr. 10, 2009

Related U.S. Application Data

(63) Continuation of application No. 10/071,053, filed on Feb. 8, 2002, now Pat. No. 7,519,551, which is a continuation-in-part of application No. 09/677,535, filed on Oct. 2, 2000, and a continuation-in-part of application No. 09/176,340, filed on Oct. 21, 1998, now Pat. No. 6,374,231.

(51) Int. Cl.
*G06Q 40/00* (2006.01)
(52) U.S. Cl. .......................................... 705/35; 707/705
(58) Field of Classification Search .................... 705/30, 705/35, 38–40, 42; 707/1, 10, 100–104, 707/705; 902/24, 41
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |

(Continued)

FOREIGN PATENT DOCUMENTS

JP 10-049590 2/1998

(Continued)

OTHER PUBLICATIONS

Hencke, "New Rules for FDIC deposit Insurance", ABA Bank Compliance, v20n7, pp. 31-37, Jul./Aug. 1999.*

(Continued)

*Primary Examiner* — Mary Cheung
(74) *Attorney, Agent, or Firm* — Foley & Lardner LLP

(57) ABSTRACT

A method, system, and program product for managing funds for a plurality of client accounts at a first banking institution, the system comprising: one or more electronic databases, comprising: (i) client account information; (ii) aggregated transaction account information for a plurality of FDIC-insured and interest-bearing aggregated deposit accounts held in a plurality of banks in a program including the first banking institution; and (iii) subaccount information; and one or more computers configured for (a) accessing the electronic database and administering clients' deposits and withdrawals from the client accounts, comprising processing transaction data for more than six (6) withdrawals and/or transfers from each of at least two of the client accounts; (b) determining, whether the balance of funds for the respective client in the aggregated deposit account at the first bank equals or exceeds a specified amount, and if not, then designating the first bank to receive the deposit, and if it does, determining another bank in the program and designating the deposit for the other bank.

36 Claims, 6 Drawing Sheets

U.S. PATENT DOCUMENTS

| | | |
|---|---|---|
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A * | 9/1998 | Sampson et al. ............... 705/35 |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,852,811 A | 12/1998 | Atkins |
| 5,864,685 A | 1/1999 | Hagan |
| 5,875,437 A * | 2/1999 | Atkins ............................ 705/40 |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 * | 11/2001 | Killeen et al. ............... 705/36 R |
| 6,363,360 B1 | 3/2002 | Madden |
| 6,374,231 B1 | 4/2002 | Bent et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,206,761 B2 | 4/2007 | Colvin |
| 7,216,100 B2 | 5/2007 | Elliott |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,440,914 B2 | 10/2008 | Jacobsen |
| 7,509,286 B1 | 3/2009 | Bent et al. |
| 7,519,551 B2 | 4/2009 | Bent et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,668,772 B1 | 2/2010 | Bent et al. |
| 7,672,886 B2 | 3/2010 | Bent et al. |
| 7,680,734 B1 | 3/2010 | Bent et al. |
| 7,716,131 B2 | 5/2010 | Bent et al. |
| 7,769,688 B1 | 8/2010 | Bent et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del Rey et al. |
| 2004/0177036 A1 | 9/2004 | Nutahara et al. |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0047593 A1 | 3/2006 | Naratil et al. |
| 2006/0106703 A1 | 5/2006 | Del Rey et al. |
| 2006/0155644 A1 | 7/2006 | Reid et al. |
| 2006/0167773 A1 | 7/2006 | Yang et al. |
| 2006/0213980 A1 | 9/2006 | Geller et al. |
| 2006/0273152 A1 | 12/2006 | Fields |
| 2007/0043666 A1 | 2/2007 | Burdette |
| 2007/0118449 A1 | 5/2007 | De La Motte |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0097809 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0222053 A1 | 9/2008 | Jacobsen |
| 2009/0006985 A1 | 1/2009 | Fong et al. |
| 2009/0012899 A1 | 1/2009 | Friesen |
| 2009/0138412 A1 | 5/2009 | Jacobsen |

FOREIGN PATENT DOCUMENTS

| | | |
|---|---|---|
| WO | WO-95/23379 | 8/1995 |
| WO | WO-99/18529 | 4/1999 |
| WO | WO-02/42952 A1 | 5/2002 |
| WO | WO-03/012580 | 2/2003 |
| WO | WO-2005/006111 | 1/2005 |

OTHER PUBLICATIONS

U.S. Appl. No. 60/307,815, filed Jul. 27, 2001.

U.S. Appl. No. 60/323,365, filed Sep. 20, 2001.
U.S. Appl. No. 10/825,440, filed Apr. 4, 2004, Bent et al.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit On Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits: Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing On Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Deposit Growth Strategies For Financial Institutions, New Sweep Account Helps Retain $40 Million in Business Deposits, vol. 7, No. 12, The Reserve Funds, May 2001, 1 Sheet.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
FDIC Federal Register Citations: Email from Bert Ely to Comments. Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDIC, Federal Deposit Insurance Corporation. Letter to Mr. Ronald Rexter, Feb. 28, 2003, From Michelle M. Borzillo, Counsel Supervision and Legislation Section, 2 Sheets.
FINISTAR, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_.
Heavyweight Funding, Bankers News, Mar. 4, 2003, vol. II, Issue No. 5. 2 Sheets.

Hoffman, "Reserve's FDIC-Insured Account Draws Regionals; But some see little need for insurance," Crain Communications Inc., Investment News, 2 Sheets, Jun. 4, 2001.

In The Know, Important Information About Your Account, Smith Barney Citigroup, 2005, 6 Sheets.

Insured Cash Account Program Disclosure Booklet, LPL Financial Services, Linsco/Private Ledger, Member NASD/SIPC.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Case No. 09 CV 2677.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Case No. 09 CV 2675.

Lawsuit by Promontory Interfinancial Network, LLC against Double Rock Corporation p/k/a Reserve Management Corporation and Lids Capital LLC, Amended Complaint, Civil Action No. 1:09 CV 316.

Lawsuit by Promontory Interfinancial Network, LLC against Double Rock Corporation p/k/a Reserve Management Corporation, Complaint, Civil Action No. 1:09 CV 316.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Merle Y. Waldman, LEXSEE 1985 Sec No- Act., Lexis 1593, Securities Exchange Act of 1934—Section 15(a), Jan. 8, 1985, 11 Sheets.

Letter From Michael Bradfield, General Counsel, Board of Governors of the Federal Reserve System, Nov. 16, 1984, 4 Sheets.

Letter From Oliver I. Ireland, Associate General Counsel, Board of Governors of the Federal Reserve System, Jun. 22, 1988, 5 Sheets.

Letter from Stephanie Martin, Assoc. General Counsel, Board of Governors of the Federal Reserve System, Apr. 22, 2004, 8 Sheets.

Letter From William W. Wiles, Secretary of the Board, Board of Governors of the Federal Reserve System, Jun. 22, 1983, 6 Sheets.

Letter To Mr. James E. Creekman, Group Vice President, From Oliver Ireland, Associate General Counsel, Aug. 1, 1995, 4 Sheets.

Letter To Mr. Jonathan L. Levin, Esq., From Oliver Ireland, Associate General Counsel, Oct. 18, 1996, 2 Sheets.

Letter To Mr. L.P. Fleming, Jr., Esq., From Oliver Ireland, Associate General Counsel, Feb. 7, 1995, 3 Sheets.

Letter To Ms. Brenda L. Skidmore, Senior Vice President, From Oliver Ireland, Associate General Counsel, Aug. 30. 1995, 4 Sheets.

Liberman et al., Market Watch, "How Important are Banks?" FDIC Insurance on Deposits Just One Continuing Advantage, Oct. 17, 2006, 3 Sheets.

McReynolds et al. "Unusual Products for Unusual Times," Securities Data Publishing on Wall Street, 6 Sheets, May 1, 2001.

McReynolds, "The Power of Cash: Ho-hum cash can be great product (and lead to more business) in troubled times," Securities Data Publishing on Wall Street, 3 Sheets, Jun. 1, 2002.

Merriam-Webster Online Dictionary, 10th Edition, Definition of "Associated", 2 Sheets.

Merrill Lynch & You, "Financial Services The Way You Want, When You Want Them," Jan. 2000 4 Sheets.

Merrill Lynch Announces Beyond Banking, The Power of Advice For Smarter Cash Management, Jan. 8, 2 Sheets.

Merrill Lynch, Pierce, Fenner & Smith Incorporated, "Information Statement," 2000, 12 Sheets.

Merrill Moves CMA Cash to Bank, Street Talk, On Wall Street, Nov. 2000, p. 26.

Money Fund Report, Bank of New York Adds Insured Sweeps Option, Friday, May 3, 2002, The Reserve Funds, 1 Sheet.

Money Fund Report, IBC Financial Data, Inc., Nov. 6, 1998, 1 Sheet.

Money Fund Report, Insured Cash Sweep Options Proliferate, Friday, Jun. 1, 2001, The Reserve Funds, 1 Sheet.

Money Market Insight's, Goldman Sachs May Create Bank to Offer Insured Cash Sweeps, Aug. 2002 Issue, 3 Sheets.

Munk, Merrill Makes New Push Into Traditional Banking, Dow Jones Newswires, Jan. 3, 2003, 1 Sheet.

Mutual Funds Magazine, Bargain Basement Funds, Oct. 1997, 2 Sheets.

News Article: "Regulators Support Demand Deposit Bill", Regulatory Compliance Watch—Mar. 9, 1998; 2 Sheets, vol. 9, No. 10.

O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.

On Wall Street, Helping Brokers Build A More Successful Business, The Power of CASH Jun. 2002, 2 Sheets.

On Wall Street, Helping Brokers Build A More Successful Business, Usual Products For Usual Times, May 2001, 2 Sheets.

Online, www.usabancshares.com, Brave New World, 1999, 2 Sheets.

Part: 2, Monetary Policy and Reserve Requirements, Subpart—Regulation D, Board Interpretations of Regulation D, Transaction Accounts—Linked To Time Deposits, vol. 1, Federal Reserve Regulatory Service, 2 Sheets.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Promontory Interfinancial Network: http://www.promnetwork.com/index.html, 2003.

Reserve Insured Deposits, United States Patent and Trademark Office, Reg. No. 2,694,910, Registered Mar. 11, 2003., 1 Sheet.

Reserve Management Corporation, Reserve Insured Deposits, U.S. Appl. No. 76/315,600, Issued.

Share, "New Service Skirts FDIC's $100K Limit," Dialog Web Command Mode, 2 Sheets, Jun. 13, 2003, http://www.dialogweb.com/cgi/dwclient.

Smith, "IBAA Won't Push Interest-Bearing Checking for Business; Says Too Few Members Want It," The American Banker, 2 Sheets, Apr. 18, 1996.

Stafford, "New Bank Program Allows $1 Million in Insured Deposits," Dialog Web Command Mode, 3 Sheets, Aug. 24, 2003, http://www.dialogweb.com/cgi/dwclient.

Sweeping Your Firm Into FDIC Insured Deposits, Harken Financial Services, Aug. 4, 2006, 8 Sheets.

Testimony of Bruce R. Bent, CEO of The Reserve Funds, Before The Financial Institutions and Consumer Credit Subcommittee House Financial Services Committee U.S. House of Representative, Hearing On H.R. 758 and H.R. 859, Mar. 5, 2003, 4 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.

The Reserve Fund, Study of U.S. Patent No. 6,374,231, 1 Sheet.

The Reserve Funds Press Release, "The Reserve Funds and Frontier Bank Partner to Offer Revolutionary Banking Product," 5 Sheets, Aug. 1, 2000.

The Reserve Funds, NJBA Endorses New Sweep Account Offers New Jersey Banks Deposit Growth, Retention, For Immediate Release, May 23, 2001, 1 Sheet.

The Reserve Funds, Reserve Management and Irwin Union Bank and Trust Company Partner to Offer the Reserve Return Sweep, For Immediate Release, Mar. 8, 2001, 2 Sheets.

The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.

The Reserve, "Reserve Insured Deposits," 2 Sheets, Oct. 4, 2006, http://www.ther.com/ps/ps_fif.shtml.

The Reserve, "What Sets Us Apart," 2 Sheets, Oct. 4, 2006, http://www.ther.com/bank/bank_wsua.shtml.

The Unmatched Sweep Solution From the Cash Management Expert, 2 Sheets.

Waddell, "Sweeping Clean," Advisor, The Advisor to Advisors, 2 Sheets.

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets. (Previously disclosed).
Letter From Oliver I. Ireland, Associate General Counsel, Board of Governors of the Federal Reserve System, Jun. 22, 1988, 5 Sheets. (Previously disclosed).
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Market with an Important Plus., 2 sheets.

Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93—35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look At Tiers, Vol. II, No. 4, Apr. 1987, 6 pgs.
Interest Rate Review© A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets. (Previously disclosed).
Merrill Lynch, Pierce, Fenner & Smith Incorporated, "Information Statement," 2000, 12 Sheets. (Previously disclosed).
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.
Letter from Marilyn J. Hensle, announcing Salomon Smith Barney Bank Deposit Program. ™, with Q&A, 14 sheets.
Bank Deposit program Disclosure Statement, Salomon Smith Barney, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.,
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.

The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Quest Cash Management Services Memorandum from Everett Alcenat re: Quest Insured Account, Nov. 16, 1993, 1 sheet.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Accounts$^{SM}$ System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
U.S. Appl. No. 09/677,535, filed Oct. 2, 2000, Bent et al.
U.S. Appl. No. 10/305,439, filed Nov. 26, 2002, Bent et al.
U.S. Appl. No. 11/149,278, filed Jun. 10, 2005, Bent et al.
U.S. Appl. No. 11/641,046, filed Dec. 19, 2006, Bent et al.
U.S. Appl. No. 11/689,247, filed Mar. 21, 2007, Bent et al.
U.S. Appl. No. 11/767,827, filed Jun. 25, 2007, Bent et al.
U.S. Appl. No. 11/767,837, filed Jun. 25, 2007, Bent et al.
U.S. Appl. No. 11/767,846, filed Jun. 25, 2007, Bent et al.
U.S. Appl. No. 11/767,856, filed Jun. 25, 2007, Bent et al.
U.S. Appl. No. 11/840,064, filed Aug. 16, 2007, Bent et al.
U.S. Appl. No. 11/840,060, filed Aug. 16, 2007, Bent et al.
U.S. Appl. No. 11/840,052, filed Aug. 16, 2007, Bent et al.
U.S. Appl. No. 11/932,762, filed Oct. 31, 2007, Bent et al.
U.S. Appl. No. 12/271,705, filed Nov. 14, 2008, Bent et al.
U.S. Appl. No. 12/025,402, filed Feb. 4, 2008, Bent et al.
U.S. Appl. No. 12/340,026, filed Dec. 19, 2008, Bent et al.
U.S. Appl. No. 12/385,522, filed Apr. 10, 2009, Bent et al.
U.S. Appl. No. 12/408,507, filed Mar. 20, 2009, Bent et al.
U.S. Appl. No. 12/408,511, filed Mar. 20, 2009, Bent et al.
U.S. Appl. No. 12/408,523, filed Mar. 20, 2009, Bent et al.
U.S. Appl. No. 12/453,387, filed May 8, 2009, Bent et al.
U.S. Appl. No. 12/453,388, filed May 8, 2009, Bent et al.
U.S. Appl. No. 12/453,389, filed May 8, 2009, Bent et al.
U.S. Appl. No. 12/453,390, filed May 8, 2009, Bent et al.
U.S. Appl. No. 12/622,979, filed Nov. 20, 2009, Bent et al.
U.S. Appl. No. 12/638,544, filed Dec. 15, 2009, Bent et al.
U.S. Appl. No. 12/684,071, filed Jan. 7, 2010, Bent et al.
U.S. Appl. No. 12/686,797, filed Jan. 13, 2010, Bent et al.
Deutsche Bank Insured Deposit Program, Marketing Literature 2007, 3 pages.
Dreyfus Insured Deposit Program, Disclosure Statement and Terms and Conditions, Dreyfus A BNY Mellon Company, 8 Sheets.
Dreyfus Insured Deposit Program, Multiple List Program—Effective May 11, 2009, 1 Sheet.
Federal Register: Oct. 9, 1997 (vol. 62, No. 196), pp. 52809-52868. http://www.fdic.gov/news/news/inactivefinancial/1997/fil97111b.html.
Financial Services Industry, "WebWatch: Trading Company Bundles CDs For Better Rates," Community Banker, Jun. 2002, online, http://findarticles.com/p/articles/mi_qa5344/is_200206/ai_n21313883.
Finistar Reg. No. 2,939,558, Registered Apr. 12, 2005.
Garmhausen, "Matching Small Banks with Large Muni Deposits," American Banker, Online The Financial Services Resource, Oct. 4, 2005, 4 pages, http://www.finstar.com/docs/AmericanBanker.html.
IDC Deposits, online, http://idcdeposits.com/ 2 Sheets.
Jong et al., "The Valuation and Hedging of Variable Rate Savings Accounts," University of Amsterdam, Nov. 15, 2001, 23 Sheets.
Lake Forest Bank & Trust Company, Introducing MaxSafe Deposit Accounts with up to $3.75 Million in FDIC Insurance, www.lakeforestbank.com/maxsafe, 2 Sheets.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stem, including Exhibits A, B, C, D, E and F, Nov. 11 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline For Business Conduct"; "Commitment To Clarity"; "Cash Management Account"; "Information Statement Regarding Changes To Interest Rates On Deposits in Merrill Lynch Banks"; . . . Feb. 5, 2008 (Document 71).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 75).

Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).

Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).

Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).

Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by Carlo DeBlasio, et al. against Merrill Lynch & Co., Inc., et al., Opinion and Order Regarding Motions, Jul. 27, 2009, Case No. 07 CIV 318(RJS).

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer To Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-Ill of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Letter From Joseph A. DiNuzzo, Counsel, Oct. 20, 1999, FDIC, Federal Deposit Insurance Corporation, 1 Sheet.
Letter From Roger A. Hood, Assistant General Counsel, Jul. 16, 1986, FDIC, Federal Deposit Insurance Corporation, Legal Division, 1 Sheet.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD, 4 Sheets.
Promontory Interfinancial Network, Promontory Interfinancial Network Announces New Deposit Placement Service, Jan. 21, 2003, 3 Sheets.
Ring, National /Global, "Amex Spans The Globe in Retail Bank Buildup," Nov. 27, 2000, 1 Sheet.
The Depository Trust Company, B#: 3875, Oct. 1, 2002, Settlement\Underwritting, From: Denise Russo, Director, Underwritting, 6 Sheets.
The Pershing Press, Dreyfus Insured Deposit Program, Issue 2, Aug. 2008, http://www.pershing.com/news/pershing_press/news_466244.html, 2 Sheets.
The Reserve Funds, Objectives, Observations & Strategies For American Enterprises Inv., Oct. 18, 2000, 11 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, November 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 6 pgs.
Total Bank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Litigation Notice After Payment of Issue Fee with Attachments filed in Parent U.S. Appl. No. 10/071,053, filed Apr. 2, 2009, 160 pages.
U.S. Appl. No. 09/677,535, filed Oct. 2, 2000, Bruce Bent et al.
U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Litigation Notice After Payment of Issue Fee filed in Parent U.S. Appl. No. 10/382,946, filed Apr. 3, 2009, 6 pages.
Federal Register: Oct. 9, 1997 (vol. 62, No. 196), pp. 52809-52868. http://www.fdic.gov/news/news/inactivefinancial/1997/fil97111b.html.
FINTRAC's Guidelines, 1 page, (http://www.fintrac.gc.ca/publications/guide/guide-eng.asp).
Hencke, "New Rules for FDIC deposit Insurance", ABA Bank Compliance, vol. 20, No. 7, Jul./Aug. 1999, pp. 31-37.
Insured Cash Account Program Disclosure Booklet, LPL Financial Services, Linsco/Private Ledger, Member NASD/SIPC.
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and lntrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and lntrasweep LLC against Institutional Deposits Corp., Consent Order, Apr. 21, 2010, Case No. 09-CV-3079 (Document 44).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Documetn 114).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Clomplaint and Counter Claims, Jun. 25, 2009, Civil Action No. 09 CIV 2675.

Mutual Fund Dealers Association, 1 page, (http://www.mfda.ca/.

Email from Olivia Kim to Charles Macedo on May 13, 2010 with attachment of Lawsuit by Island Intellectual Property LLC, Lids Capital LLC, Double Rock Corporation, and lntrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).

Email from Olivia Kim to Charles Macedo on May 13, 2010 with attachment of Lawsuit by Island Intellectual Property LLC, Lids Capital LLC, Double Rock Corporation, and lntrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).

U.S. Appl. No. 12/794,448, filed Jun. 4, 2010, Bent et al.
U.S. Appl. No. 12/794,545, filed Jun. 4, 2010, Bent et al.
U.S. Appl. No. 12/816,092, filed Jun. 15, 2010, Bent et al.

Email from Kim Olivia to Charles Macedo on Jun. 9, 2010 with attachement of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).

Insured Bank Deposit Program Summary Information Statement, Information Statement, and list of Eligible Program Banks Effective Feb. 10, 2005, 11 pages.

Promontory Interfinancial Network: Frequently Asked Questions (FAQs), Feb. 5, 2003, 5 pages.

Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.

Exhibit 2, Invalidity Chart: U.S. Pat. No. 4,985,833 (Oncken)—U.S. Pat. 7,668,771, Jul. 2010, 14 pages.

Exhibit 5, Invalidity Chart: Merrill Lynch Business Advantage Program—U.S. Pat. No. 7,668,772, Jul. 2010, 7 pages.

Exhibit 8, Invalidity Chart: Harken Financial Services Sweep Product—U.S. Pat. No. 7,668,771, Jul. 2010, 9 pages.

Exhibit 9, Invalidity Chart: Wayne Hummer—Insured Bank Deposit Program—U.S. Pat. No. 7,668,771, Jul. 2010, 12 pages.

Exhibit 10, Invalidity Chart: U.S. Patent Application Publication No. 2007/0043666 (Burdette), U.S. Pat. No. 7,668,771, Jul. 2010, 9 pages.

2 CDs (1) Non-Confidential Exhibits and Material regarding Deutsch Bank Trust Company Americas' (DBTCA) $2^{nd}$ Supp Res to Double Rock's Interrogatory No. 2; (2) Prior Art for IC Non-Confidential Material—Bates-numbered documents for Exhibits 2, 5, 8, 9, and 10 Invalidity Charts, Jul. 2010.

Letter to R.M. Zaitzeff, from W.W. Wiles, dated Jun. 22, 1983 (response to May 10, 1983 letter re: offering of MMDAs), 6 pages.

Letter to G.T. Schwartz, from O.I. Ireland, dated Jun. 22, 1988 (response to Dec. 18, 1987 letter re: proposed modifications to Merrill Lynch's CMA Program), 5 pages.

Information Statement, "Alliance Insured Account," Sep. 1999; 6 pages.

Investors MoneyAccount$^{SM}$ and Insurance Plus Service Agreement, attached Schedule A (List of Banks Participating in the Insurance Plus Service), Imad Mar. 1994, 3 pages.

Investors Money Accounts$^{SM}$ (an FDIC-insured money market account), IMA-1 (Mar. 1994), 4 pages.

Investors MoneyAccount$^{SM}$, "The FDIC-Insured Money Market Investment with an Important Plus," IMA Oct. 1995, 2 pages.

1985 SEC No-Act. Lexis 2756, Investment Company Act of 1940—Section 3(a)(1), 2(a)(36); Securities Act of 1933—Section 2(1), Nov. 29, 1985, Kemper Financial Services, Inc., 9 pages.

Insured Money Account Program Agreement and Disclosure Statement, (attached Schedule A—Deposit Account Terms), faxed Mar. 28, 2000; 10 pages.

First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.

Summary of Commentary on Current Economic Conditions by Federal Reserve Districts, Jan. 1985, 44 pages.

12 CFR Ch. II (Jan. 1, 2009 Edition), pp. 124-125.

Product Strategy, "Money Fund $$ Moving to Bank Deposits, Distributors Start to Install Bank Deposit Accounts to Replace Money Funds," 6 FRC Monitor, Dec. 2003, 2 pages.

Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.

Interest Rate Review, A Publication of the Meyer Weekly Interest Rate Survey, "A Look at Tiers," Apr. 1987, 6 pages, vol. 11, No. 4.

LexisNexis, The American Banker, "Merrill Joins Money Market Account, CMA; Broker Begins Testing With 12 Institutions," Sep. 23, 1983, 4 pages.

Bent et al., Office Action, U.S. Appl. No. 10/071,053, with attached SB08, date considered Mar. 10, 2009, 2 pages.

Merrill Lynch & You, "Financial Services The Way You Want, When You Want Them," Jan. 2000, 16 pages.

Exhibit 1, "FA/FB Account 1997 First Transactions, TRX Types: PU, PP, TA, PT," Aug. 2003, p. 1-2.

Advertisement: Where Your Interest is?, Mutual Funds, Oct. 1997; 1 page.

Advertisement: It's 1997, Do You Know Where Your Interest Is?, Mutual Funds, Dec. 1993, p. 46.

USPTO Office Action, Interview Summary, U.S. Appl. No. 11/767,827, Date Mailed Sep. 23, 2009, 4 pages.

USPTO Office Action, Office Action Summary, U.S. Appl. No. 11/767,827, Date Mailed Jun. 5, 2009, 35 pages.

Service Mark Application, Applicant: Reserve Management Corporation, Mark: Reserve Insured Deposits, (attached Power of Attorney, Declaration, Drawing page, 9-21-01, 6 pages.

Letter to R.L. Kratzer, from T.J. Vezeau, Re: United States Patent No. 6,374,231, dated Jan. 10, 2003, 1 page.

Letter to C.R. Macedo, from R.L. Rainey, Re: Promontory Interfinancial Network, LLC, dated Jul. 22, 2008, (attached Attachments A-E), 35 pages.

Letter to C.R. Macedo, from R.L. Rainey, Re: Promontory Interfinancial Network, LLC, dated Oct. 16, 2008, (attached Attachments A-C), 22 pages.

Letter to C.R. Macedo, from R.L. Rainey, Re: Promontory Interfinancial Network, LLC, dated Feb. 23, 2009, (attached Exhibit A-B), 21 pages.

Letter to R.L. Kratzer, from T.J. Vezeau, Re: United States Patent No. 6,374,231, dated Jan. 10, 2003 (with various attachments), 128 pages.

Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Ralph, Customer Service, from Bruce Bent II, Re: Reserve IDA, Sep. 4, 1997, 1 page.
Memo to Marianne, Pat, Bruce Bent, from Bruce Bent II, Re: Reserve Insured Deposit Account, Sep. 4, 1997, 1 page.
American Express—Meeting Notes, Sep. 26, 2000, 2 pages.
American Express Financial Advisors Customized FDIC Product with Tiered Balances, Jan. 24, 2001, 2 pages.
American Express Conference Call Minutes, Topic: Tiered Balances, Jan. 25, 2001 @ 3:00pm-4:00pm, 2 pages.
Letter to A.J. Bufalino, from C.R. Macedo, Re: Reserve Management Corporation, Wayne Hummer Investments LLC, May 8, 2007, (enclosing Jan. 3, 2006 letter to A.J. Bufalino, Feb. 23, 2006 letter to A.J. Bufalino, Mar. 16, 2006 letter to C. Macedo, U.S. Patent No. 6,374,231, U.S. Publication No. 2002/0091637 A1, U.S. Publication No. 2005/0108149 A1, U.S. Publication No. 2005/0228733 A1, U.S. Publication No. 2006/0212385 A2, U.S. Publication No. 2006/0212389 A2), 510 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savingsn™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Aryan, 4 pages.
Merrill Lynch & Co Inc—MER, 10k Wizard, Form 8-K, "Report of Unscheduled Material Events or Corporated Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.

Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
American Express—Meeting Notes Sep. 26, 2000, 2 pages.
American Express Conference Call Minutes, Jan. 25, 2001 @ 3:00pm-4:00pm, Topic: Tiered Balances, 2 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, the Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builders$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Lawsuit by *Island Intellectual Property LLC, et al.*, against *Deutsche Bank Trust Company Americas, et al.*; Defendant Deutsche Bank Trust Company Americas' Fifth Supplemental Responses to Island IP's First Set of Common Interrogatores to All Defendants (No. 7); Case No. 09 Civ. 2675 (VM)(AJP); Sep. 16, 2010; 9 pages.
Lawsuit by *Island Intellectual Property LLC, et al.*, against *Deutsche Bank Trust Company Americas, et al.*; Defendant Total Bank Solutions, LLC's Fifth Supplemental Responses to Island IP's First Set of Common Interrogatores to All Defendants (No. 7); Case No. 09 Civ. 2675 (Vm)(Ajp); Sep. 16, 2010; 9 pages.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter from Roger M. Zaitzeff, Seward & Kissel to Gilbert T. Schwartz, Associate General Counsel, Board of Governors of the Federal Reserve System; May 10, 1983, 5 sheets.

Wayne Hummer Money Market Fund Brochure, Performance Data as of Mar. 31, 2003, including Commentary page (attached http://www.whummer.com/funds/money.asp and http://www.whummer.com/fund_dis.htm), 4 pages.

Wayne Hummer Money Market Fund, "Annual Financial Statements," Mar. 31, 2003, 12 pages.

Wayne Hummer Investment Trust, Investment Company Act File No. 811-3880, "Start Investing Today . . . ," Prospectus, Jul. 31, 2002, 44 pages.

Wayne Hummer Management Company, retrieved from the Internet: "Organization & Clients," http://www.whmgmtco.com; "Assets Under Management—Dec. 31, 2002," http://www.whmgmtco.com/asset.htm; "Equity & Mid Cap Growth Investment Philosophy," http://www.whmgmtco.com/equ-phil.htm; "Economic & Market Commentary—Jan. 2003," http://www.whmgmtco.com/commentary.htm; "Management Team," http://www.whmgmtco.com/team.htm; "Fixed Income Performance," http://www.whmgmtco.com/fixedperf.htm; "Mid-Cap Equity Performance," http://www.whmgmtco.com/mid-perf.htm; "All Equity Performance," http://www.whmgmtco.com/all-perf.htm, 11 pages [retrieved on Jul. 2, 2003].

Wayne Hummer Market Letter, Jul./Aug. 2003, 2 pages.

Wayne Hummer Investments, "Wintrust Financial Corporation Reports Second Quarter Earnings; Second Quarter Net Earnings Up 45%," Jul. 18, 1 page.

Weber Shandwick Worldwide, News: for Immediate Release, "Wayne Hummer Investments Names New President & CEO," Apr. 2003, 2 pages.

Wayne Hummer Investments, retrieved from the Internet: "Our People Focused On Your Investments," Jul. 2, 2003, http://www.whummer.com/; "Stocks & Bonds," http://www.whummer.com/stocks_bonds.htm; "Mutual Funds," http://www.whummer.com/mutual_funds.htm; "Morning Comments," http://www.whummer.com/morningcomments.asp, 6 pages [retrieved on Jul. 2, 2003].

Wayne Hummer Investments, "Investment Executives," retrieved from the Internet: http://www.whummer.com/investment_executives.htm, 2 pages [retrieved on Jul. 2, 2003].

Wayne Hummer Investments LLC, "Consolidated Statement of Financial Condition," with Report of Independent Auditors, Dec. 31, 2002, 12 pages.

Wintrust Financial Corporation, "Wintrust Financial Corporation Reports Record Earnings for the Fourth Quarter and Year; Fourth Quarter Net Earnings Up 53%," 22 pages.

Wayne Hummer Investments, "A Letter to Wayne Hummer Investments Clients & Friends," Jul. 18, retrieved from the Internet: http://www.whummer.com/wintrust2qEarnings.html, 1 page [retrieved on Jul. 3, 2003].

Wayne Hummer Investments; Insured Bank Deposits Program—Frequently Asked Questions; obtained Dec. 26, 2002; 4 pages.

Wayne Hummer Investments, "Contact Us," retrieved from the Internet: http://www.waynehummer.com/contact_us.htm, 6 pages [retrieved on Jan. 8, 2003].

Wayne Hummer Investments for Life, Booklet, 2003, 25 pages.

Wayne Hummer, "For Time-Proven Professionalism," Booklet, 2003, 13 pages.

Wayne Hummer, "Insured Bank Deposits™ Program Information Statement," obtained Dec. 26, 2002; 12 pages.

Lawsuit by *Island Intellectual Property LLC et al.*, against *Deutsche Bank Trust Company Americas, et al.*; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1,119 pages.

Lawsuit by *Island Intellectual Property LLC et al.*, against *Deutsche Bank Trust Company Americas, et al.*; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), October 28, 2010; 1025 pages.

Lawsuit by *Island Intellectual Property LLC et al.*, against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by *Island Intellectual Property LLC et al.*, against *Deutsche Bank Trust Company Americas, et al.*; Expert Report of the Honorable Gerald J. Mossinghoff and Exhibits A-E; Civil Action No. 09 Civ. 2675 (VM)(AJP); Nov. 23, 2010; 107 pages.

Case for "CORE" Deposits, Historic Degree of Stability, 2006, 1 page.

* cited by examiner

SYSTEMS AND METHODS FOR ADMINISTERING RETURN SWEEP ACCOUNTS

This application is a Continuation of application Ser. No. 10/071,053, filed on Feb. 2, 2002, which is a Continuation-in-Part of application Ser. No. 09/677,535, filed on Oct. 2, 2000, and is a Continuation-in-Part of application Ser. No. 09/176,340, filed on Oct. 21, 1998. The entirety of the disclosure of each of these applications is incorporated herein by reference for all purposes.

FIELD OF THE INVENTION

The invention relates generally to computerized banking techniques and, more specifically, to techniques by which deposits are kept on a bank's balance sheet while being administered as sweep account funds by a third party.

BACKGROUND OF THE INVENTION

It would be desirable if investors could obtain fully-insured, interest-bearing bank accounts that offer an unlimited number of fund transfers per month. However, present statutory restrictions prevent banks and savings institutions from paying interest on certain types of deposit accounts. More specifically, Title 12, Part 329, of the Code of Federal Regulations (CFR) provides that "no bank shall, directly or indirectly, by any device whatsoever, pay interest on any demand deposit". (12 CFR 329.2). A "deposit" is any money placed into a checking account, savings account, Certificate of Deposit (CD), or the like. In a "demand" account, the owner can demand that funds be drawn and paid to another account (having the same or a different owner), or to a third party. These demand payments are typically implemented via bank drafts, checks, credit cards, and debit cards.

Not all bank accounts are considered to be demand accounts. If all, or a fixed amount, of the principal must be maintained in order to achieve the particular benefits afforded by that account, then the account is not a "demand" account. According to the CFR, a "demand deposit" includes any deposit for which the depositor is authorized to make more than six fund "transfers" during any month or statement cycle of at least four weeks. Not all fund transfers will be counted towards the allotted maximum of six; rather, it is necessary to examine the specific type of fund transfer under consideration. A deposit will be considered a "demand" deposit if the transfer takes place by means of a preauthorized, automatic, or telephonic order specifying the transfer of funds to another account of the depositor at the same bank, to the bank itself, or to a third party. Likewise, a deposit is a "demand" deposit if more than three of the six transfers are authorized to be made by check, draft or debit card (12 CFR 329.1(b)(3). On the other hand, an unlimited number of transfers is allowed between two accounts registered to the same person or entity, provided that the transfers are made by messenger, mail, telephone (but only via check mailed to the depositor), automated teller machine, or in person. Unless the funds of a deposit are held in a money market account (18 USC 1832 (a)), an account for which a depositor has the ability to make at least six transfers will be deemed a demand account, and no interest will be payable on the funds therein. Therefore, owners of demand accounts do not obtain interest on their funds.

One exemplary approach to offering investors fully-insured, interest-bearing accounts that provide up to an unlimited number of fund transfers was disclosed in U.S. patent application Ser. No. 09/176,340, referenced above. This application describes a system for managing a plurality of accounts for multiple clients. These accounts, which may originate from a variety of sources, banks, brokerage firms, and/or clients, are held at any of a plurality of savings institutions or banks. The system provides an aggregate insured money market deposit account at a bank or savings institution that is not necessarily an institution at which any of the client accounts are held. The aggregate insured deposit account is linked to each of the demand accounts in a manner so as to permit deposit funds to be placed into a demand account from various sources, and also so as to provide for the tendering of payments from the demand account via different instruments, without limitation as to the number of transfers. Interest is earned on deposits because funds are transferred from individual client accounts to the managed aggregate insured deposit account.

While a substantial advance over other prior art systems, the above noted system requires the transfer of oftentimes significant funds to comply with various banking regulations. This may be difficult in the case of smaller, community-based banks, as these institutions depend upon such funds as a source for loans. Moreover, some bank clients are not comfortable with arrangements that transfer client funds to unfamiliar third parties.

Pursuant to Regulation Q, banks are prohibited from paying interest on commercial accounts. However, banks have developed several approaches in an effort to compete with brokers who offer interest on cash balances for their commercial customers. These approaches, which include money fund sweeps and repo sweeps, are disadvantageous in that they involve a removal of commercial customer deposits from the bank's balance sheets.

A substantial market exists for an interest-bearing return sweep account that can be readily integrated into the existing infrastructure of a bank or savings institution, while, at the same time, permitting account funds to remain on the bank's balance sheet, with minimal disruption of existing bank-client relationships. It was with the foregoing realizations in mind that the present invention was developed.

OBJECTS AND SUMMARY OF THE INVENTION

It is an object of the invention to provide bank and/or savings institution clients with the ability to implement up to an unlimited number of transfers while, at the same time, permitting the bank and/or savings institution to retain client-deposited funds.

It is another object of the invention to provide bank and/or savings institution clients with interest from funds on deposit while simultaneously providing the ability to implement up to an unlimited number of transfers.

It is a further object of the invention to permit the bank and/or savings institution to retain client-deposited funds on its books so that these funds can be used as a source for loans.

It is yet a further object of the invention to provide a banking method that enables clients to deposit funds into an account from any of various sources, and to make payments from the account via any of various instruments, without limitation as to the number of transfers, while still earning interest on the funds in the account.

It is another object of the present invention to provide a banking method that manages a plurality of demand accounts for multiple clients whose funds are held in an aggregate insured deposit account at the client's banking institution but managed by a third party agent.

It is another object of the invention to provide a money market banking method that has a minimal impact on presently-existing, bank-to-client relationships.

It is a further object of the invention to provide a money market banking method which is readily integrable into the existing infrastructure of a bank or savings institution.

These and other objects of the invention are realized in the form of novel systems and methods for managing a plurality of client demand accounts so as to allow a banking institution to retain client deposits on the bank's balance sheets while at the same time, providing the client with the capability of implementing up to an unlimited number of transactions per month and also providing the client with interest on their account balance. These objectives are achieved through the use of an aggregate money market deposit account and an aggregate demand deposit account. These accounts are held on the books of the client's savings institution or bank, but are managed by a third party agent for the client. In response to client deposits and withdrawals, the agent initiates a transfer of funds between the aggregate demand deposit account and the aggregate money market deposit account, If client deposits exceed client withdrawals, then all or some of the funds in the aggregate demand deposit account may be transferred to the aggregate money market deposit account. On the other hand, if client withdrawals exceed client deposits, then all or some of the funds in the aggregate money market deposit account are transferred to the aggregate demand deposit account. The aggregate money market deposit account is an interest-bearing deposit account, where the aggregate balances for all clients are deposited.

One purpose of the aggregate demand deposit account is to facilitate the movement of funds. On a regular, periodic, or recurring basis, the agent calculates a net transaction as the sum of individual client deposits and withdrawals from the plurality of individual client demand accounts. The net transaction calculation is used to determine an amount of funds that need to be deposited into the aggregate money market deposit account to cover client deposits, or an amount of funds that needs to be withdrawn from the aggregate money market deposit account to cover client withdrawals. Individual account management calculations are performed to determine whether to deposit or withdraw funds from the aggregate demand deposit account to each of a plurality of individual client return sweep and/or money market accounts. The agent updates its database for each client's deposit and withdrawal activities.

The individual client has two accounts, a client demand deposit account on the bank's books, and a return sweep account or money market account on the agent's books. Individual transactions for the client occur between these two client accounts.

The agent distributes all or a portion of the interest accrued from the aggregate deposit account to individual clients. The interest is distributed according to the relative proportions of each client's funds in the aggregate deposit account. The agent maintains a database that keeps track of deposits to, and withdrawals from, each of the client demand accounts, as well as each client's proportionate and/or monetary share in the aggregate money market deposit account.

The invention permits funds to be deposited into a demand account from various sources, and also provides for the tendering of payments from the demand account via different instruments, without limitation as to the number of transfers, and with accrual of interest on the deposited funds. Moreover, the deposited funds are retained at the client's bank or savings institution. Optionally, the debiting of funds from each of the client accounts is monitored, and debits are selectively authorized or rejected based upon the client's account balance and/or their current share in the aggregate deposit account.

BRIEF DESCRIPTION OF THE DRAWINGS

The following is a brief description of the drawings, in which.

DETAILED DESCRIPTION OF THE PREFERRED EMBODIMENTS

Figure 1:
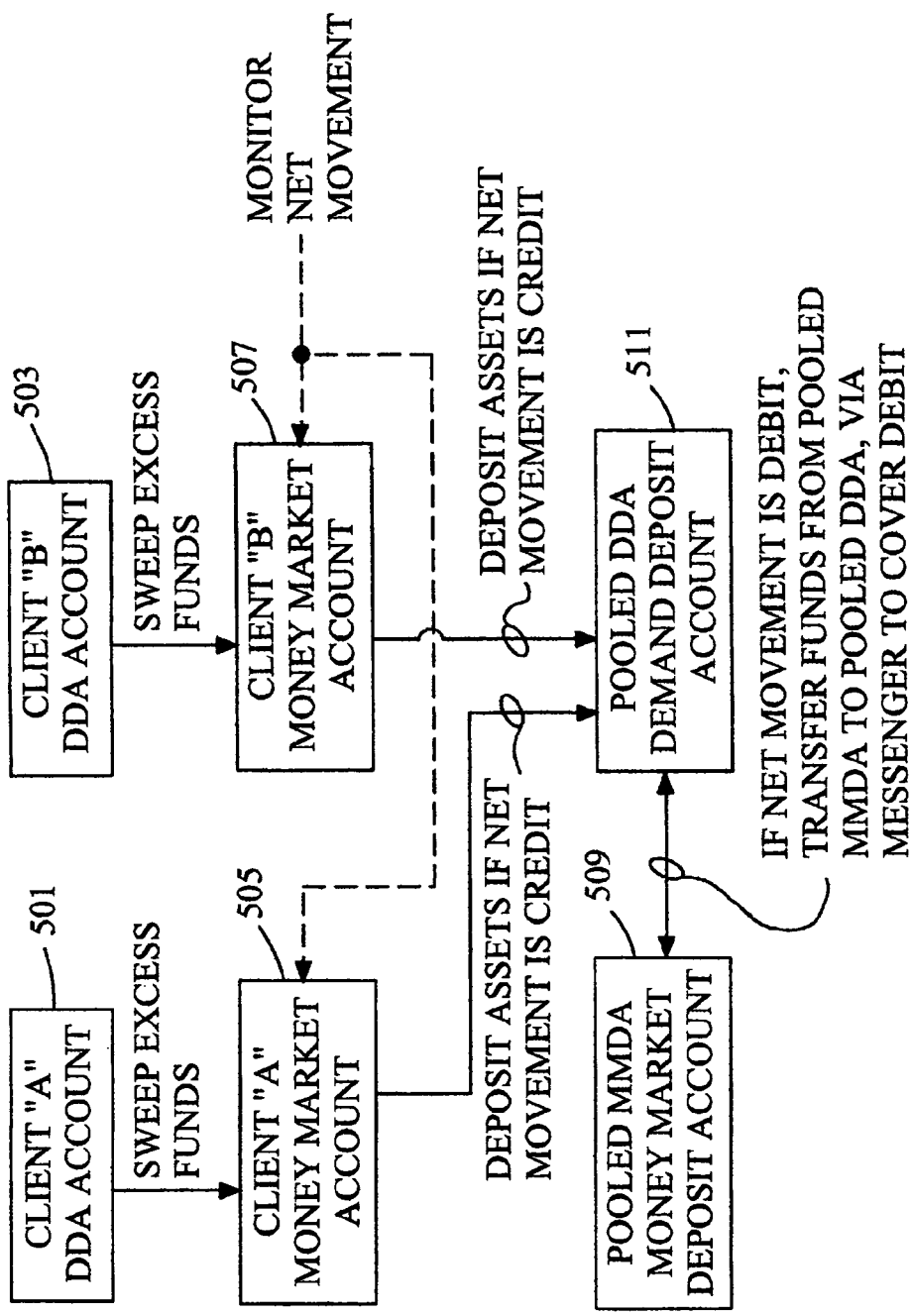
FIG. 1 is an information flow diagram showing the transfer of client funds among a plurality of accounts pursuant to the techniques of the present invention.

Refer now to FIG. 1, which is a flow diagram showing the transfer of client funds among a plurality of accounts pursuant to the techniques of the present invention. A plurality of client demand accounts, including Client "A" DDA (Demand Deposit Account) 501 and Client "B" DDA Account 503 are managed through the use of an insured pooled deposit account at the client's savings institution or bank. In FIG. 1, this pooled deposit account is provided in the form of a Pooled MMDA (Money Market Deposit Account) 509. Excess funds are swept from client DDA accounts (Client "A" DDA 501 and Client "B" DDA 503, respectively) to corresponding client Money Market Accounts (Client "A" Money Market Account 505 and Client "B" Money Market Account 507, respectively). Excess funds may be calculated in terms of a desired or target minimum balance for each of the client DDA accounts. The same target minimum balance could be applied to all DDA accounts, or an account-specific target balance could be assigned to a certain account based upon the past history and/or the expected usage of that account. Alternatively, all funds could be swept from the client DDA accounts to the Money Market Accounts. After recording the amount of funds swept into a client Money Market Account, the funds are then transferred to the Pooled MMDA Account 509.

The net result of the aforementioned fund transfer activity is that funds are effectively transferred from individual client demand accounts, including Client "A" DDA 501 and Client "B" DDA 503, to a pooled insured deposit account (Pooled MMDA Account 509) at the client's bank or savings institution. This is advantageous in that the Pooled MMDA account 509 is an interest-bearing "nondemand" account pursuant to 12 CFR 329.2 et seq. Moreover, the Pooled MMDA Account is eligible for full FDIC insurance protection. This protection covers each client whose deposits are placed into the pooled account, up to a maximum of $100,000 per client. As the Pooled MMDA Account 509 accrues interest, all or a portion of this interest is distributed to individual clients. The interest may, but need not, be distributed according to the relative proportions of each client's funds in the Pooled MMDA Account 509.

A database keeps track of deposits to, and withdrawals from, each of the client demand accounts (Client "A" DDA Account 501 and Client "B" DDA Account 503), as well as each client's proportionate and/or monetary share in the Pooled MMDA Account 509. On a regular, periodic, or recurring basis, a net transaction is calculated as the sum of individual client deposits and withdrawals from the plurality of demand accounts. The net transaction calculation is used to determine an amount of funds, if any, that needs to be deposited into the Pooled MMDA Account 509 from the individual client Money Market Accounts (Client "A" Money Market Account 505 and/or Client "B" Money Market Account 507) to cover client deposits. The net transaction calculation is also used to determine an amount, if any, of funds that need to be withdrawn from the Pooled MMDA Account 509 to cover client withdrawals from respective client DDA Accounts (Client "A" DDA Account 501 and/or Client "B" DDA Account 503). In the event that fund withdrawals are required, the necessary funds are first transferred from the Pooled MMDA Account 509 to a Pooled DDA (Demand Deposit Account) 511 which is held at the same savings institution or bank as Pooled MMDA Account 509. On an as-needed basis, funds are then transferred from the Pooled MMDA Account 509 to individual client DDA accounts (Client "A" DDA Account 501 or Client "B" DDA Account 503) to cover checks written by these clients, as well as any fund withdrawals or transfers that clients wish to implement on behalf of their respective DDA Accounts.

Individual account management calculations are performed to determine whether to deposit or withdraw funds from the Pooled DDA Account 511 to each of a plurality of individual client demand accounts. The database is updated for each client's deposit and withdrawal activities. The invention permits funds to be deposited into a client demand account from various sources, and also provides for the tendering of payments from the client demand account via different instruments, without limitation as to the number of transfers, and with accrual of interest on the deposited funds. Optionally, the debiting of funds from each of the client demand accounts is monitored, and debits are selectively authorized or rejected based upon the client's demand account balance and/or their current share in the pooled deposit account.

The foregoing procedures are structured in a manner so as to permit banks and savings institutions to continue servicing their clients as they have done in the past. Moreover, if desired, these procedures could be implemented by an agent acting on behalf of one or more clients. In this manner, the invention would be virtually transparent to presently-existing banks and savings institutions. Bank personnel would not be burdened with the requirement to perform unfamiliar and potentially time-consuming procedures. Pursuant to this "agency" approach, the agent effectively provides a "sweep interface" between a client's existing DDA account (i.e., Client "A" DDA Account 501) and a fully-insured, interest-bearing pooled account (i.e., the Pooled MMDA Account 509). The agent opens up the Pooled MMDA Account 509 and the Pooled DDA Account 511 at the client's bank or savings institution. The agent is responsible for several administrative activities, including: (1) recordkeeping in connection with the individual Client Money Market accounts (Client "A" Money Market Account 505 and Client "B" Money Market Account 507); (2) determining each client's proportionate share in the Pooled MMDA Account 509; (3) determining an appropriate balance for the Pooled DDA Account 511; and (4) determining appropriate transfers from the Pooled DDA Account 511 to any of the client DDA accounts.

Although banks and savings institutions can provide DDA, MMDA and checking account services to clients without utilizing a third-party agent, under the current statutory scheme, these institutions cannot pay interest on account balances, and at the same time, allow for an unlimited number of transactions. Pursuant to Regulation D, banks and savings institutions are prohibited from automatically allowing unlimited fund transfers between DDAs and MMDAs on behalf of clients. A client could open up his own DDA and MMDA accounts, evaluate daily DDA activities, determine if funds should be moved between the DDA and the MMDA, and instruct the bank to transfer the appropriate funds. However, it would be time consuming and inefficient. The use of an agent provides administrative expediency, endering the entire operational scheme more attractive to the client as well as the banking institution.

Advantageously, the agent maintains the client's original DDA account number that uniquely identifies that client's account at his or her bank or savings institution. This account number is used as a cross-reference to keep track of each client's proportionate interest in the Pooled MMDA Account 509. The client Money Market Account numbers (for Client "A" Money Market Account 505 and Client "B" Money Market Account 506) are transparent to these clients, as is the account number for the Pooled MMDA Account 509.

Effectively, a "sweep interface" exists between each of respective individual client DDA Accounts (Client "A" DDA Account 501 and Client "B" DDA Account 503) and corresponding individual client Money Market Accounts (Client "A" Money Market Account 505 and Client "B" Money Market Account 507). Excess funds in the individual client DDA accounts are swept to the individual client Money Market accounts to be further credited to the Pooled MMDA Account 509. If funds are needed to pay for a check or handle a withdrawal, funds are redeemed via the Pooled DDA Account 511. The sweep interface may be governed by any of a number of established or specified parameters. For example, the bank may choose to leave a certain dollar amount in each of the client DDA accounts to cover checks and only sweep funds in excess of that amount. Or the bank may decide to sweep everything and redeem funds based upon the checks presented for payment. From the standpoint of the bank or savings institution, no additional work is required. The bank merely maintains the client's existing individual DDA account along with the client's profile (name, address, check reorders, signature on file, stop payment orders, etc). Bank clients will be able to keep their existing checks, and to continue using their existing DDA accounts. Deposits are credited to these DDA accounts and then swept to the pooled MMDA account. Many of the required administrative activities are performed by the agent on behalf of designated client accounts. These administrative activities basically involve the monitoring of fund sweeping to and from individual client DDA accounts and corresponding individual Money Market accounts, as well as transfers among the individual Money Market, Pooled MMDA and Pooled DDA Accounts maintained by the agent. On a daily, regular, repeated, or periodic basis, the bank or savings institution transmits a transaction sweep data file to the agent that includes deposit and withdrawal information for each of a plurality of clients. The bank and the agent periodically or repeatedly reconcile the sweep data file and agree upon a net settlement figure. If the net settlement figure is a credit, the bank or savings institution credits the Pooled DDA Account 511. During routine, day-to-day system operations, the only transactions that occur in the Pooled MMDA Account 509 are transfers either to or from the Pooled DDA Account. Pursuant to an optional alternative approach, the bank could allocate credits to the Pooled MMDA Account 509. In any event, if the net settlement figure is a debit, the bank or savings institution debits the Pooled DDA Account 511. The agent provides instructions by messenger to transfer funds from the Pooled MMDA Account 509 to the Pooled DDA Account 511 to cover the debit balance in the account. At the end of a predetermined period of time (such as a month), the agent can provide a monthly statement file to the bank or savings institution. This file may include activity for a client's individual money market account as maintained in an agent database. The bank or savings institution can then use this monthly statement file to generate month end statements for its clients. According to one preferred embodiment of the invention, activity pertaining to other accounts is tracked and maintained by the bank or savings institution. However, pursuant to an alternate embodiment, this statement file could optionally include Pooled MMDA, Pooled DDA, individual Money Market, and/or individual DDA account activity.

Figure 2:
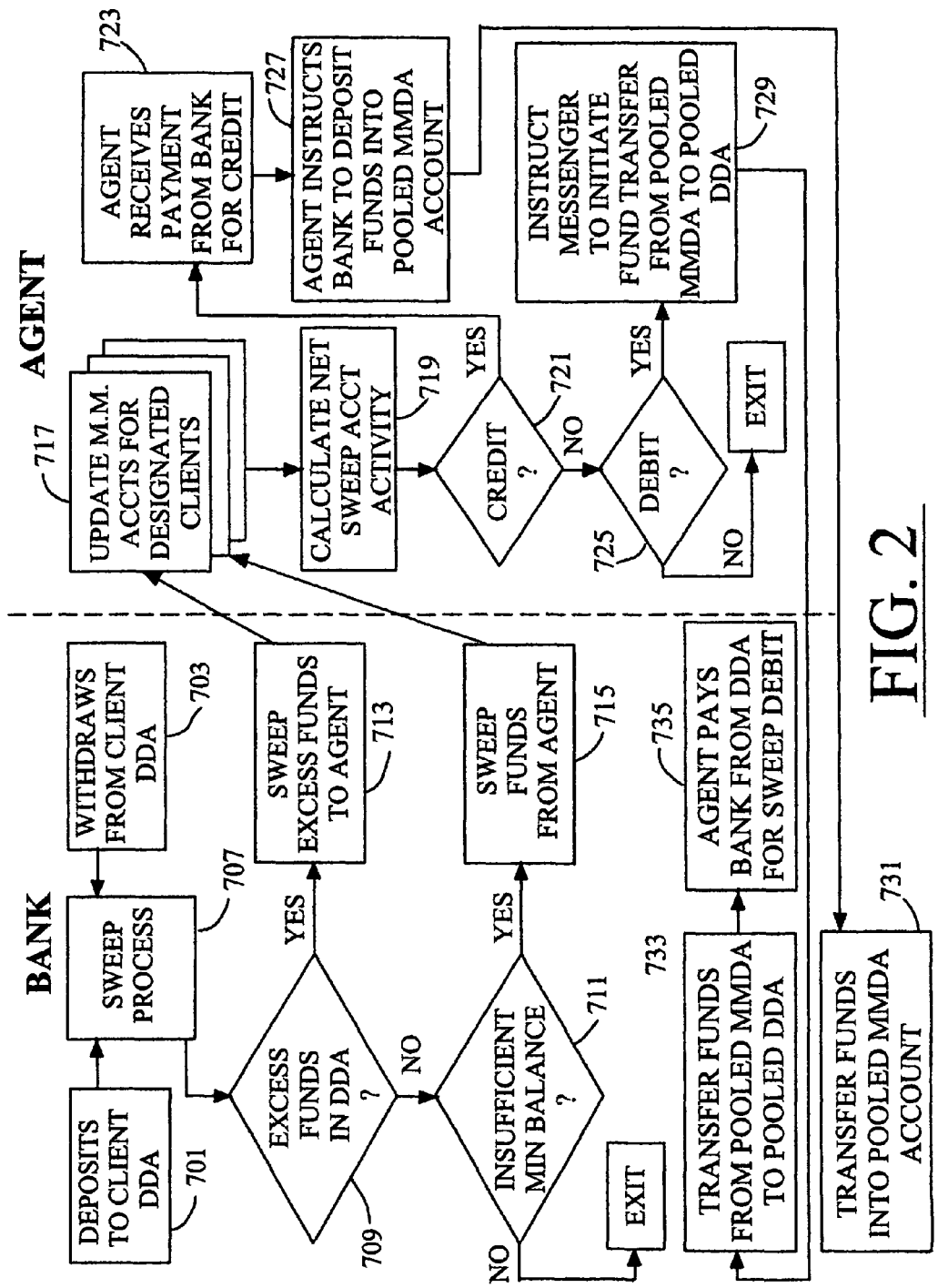
FIG. 2 is a flowchart showing an illustrative operational sequence for implementing the techniques of the present invention.

Refer now to FIG. 2, which is a flowchart showing an illustrative operational sequence for implementing the techniques of the present invention. The procedure commences at block 701, where a client makes a deposit to their individual DDA Account (i.e., Client "A" DDA 501, FIG. 1), or at block 703, where a client makes a withdrawal from their individual DDA Account. Irrespective of whether the transaction is a withdrawal or a deposit, a sweep process is performed (block 707) to sweep any excess account funds out of the client's individual DDA account, or to sweep required funds into this DDA account. A test is performed at block 709 to ascertain whether or not there are excess funds in the individual client's DDA account. If so, program control jumps ahead to block 713, whereas if not, the program continues on to block 711. At block 713, the excess funds are swept to the agent, who then updates the individual client Money Market account (block 717).

The negative branch from block 709 leads to block 711, where a test is performed to ascertain whether or not there is an insufficient minimum balance in the individual client's DDA account. If not, the program exits. If so, program control advances to block 715 where funds are swept from the agent. The agent then updates the individual client Money Market account (block 717). Next, on a periodic, repeated, or scheduled basis, the agent calculates the net sweep account activity (block 719). A test is performed at block 721 to ascertain whether or not the net sweep activity is a credit. If so, program control advances to block 723 and, if not, program control continues to block 725. At block 723, the agent receives payment from the bank for the credit. Payment can be received, for example, in the form of a wire transfer or a credit to the pooled DDA account. Next, the agent instructs the bank to deposit the received funds into the pooled MMDA account (block 727). Funds are transferred into the pooled MMDA account (block 731), and the program exits.

The negative branch from block 721 leads to block 725 where a test is performed to ascertain whether or not the net sweep activity is a debit. If not, the program exits and, if so, the program continues to block 729. At block 729, a messenger is instructed to initiate a fund transfer from the pooled MMDA account to the pooled DDA account. The funds are transferred from the pooled MMDA to the pooled DDA (block 733), and the agent pays the bank or savings institution from the pooled DDA account for the sweep debit. The program then exits.

Figure 3:
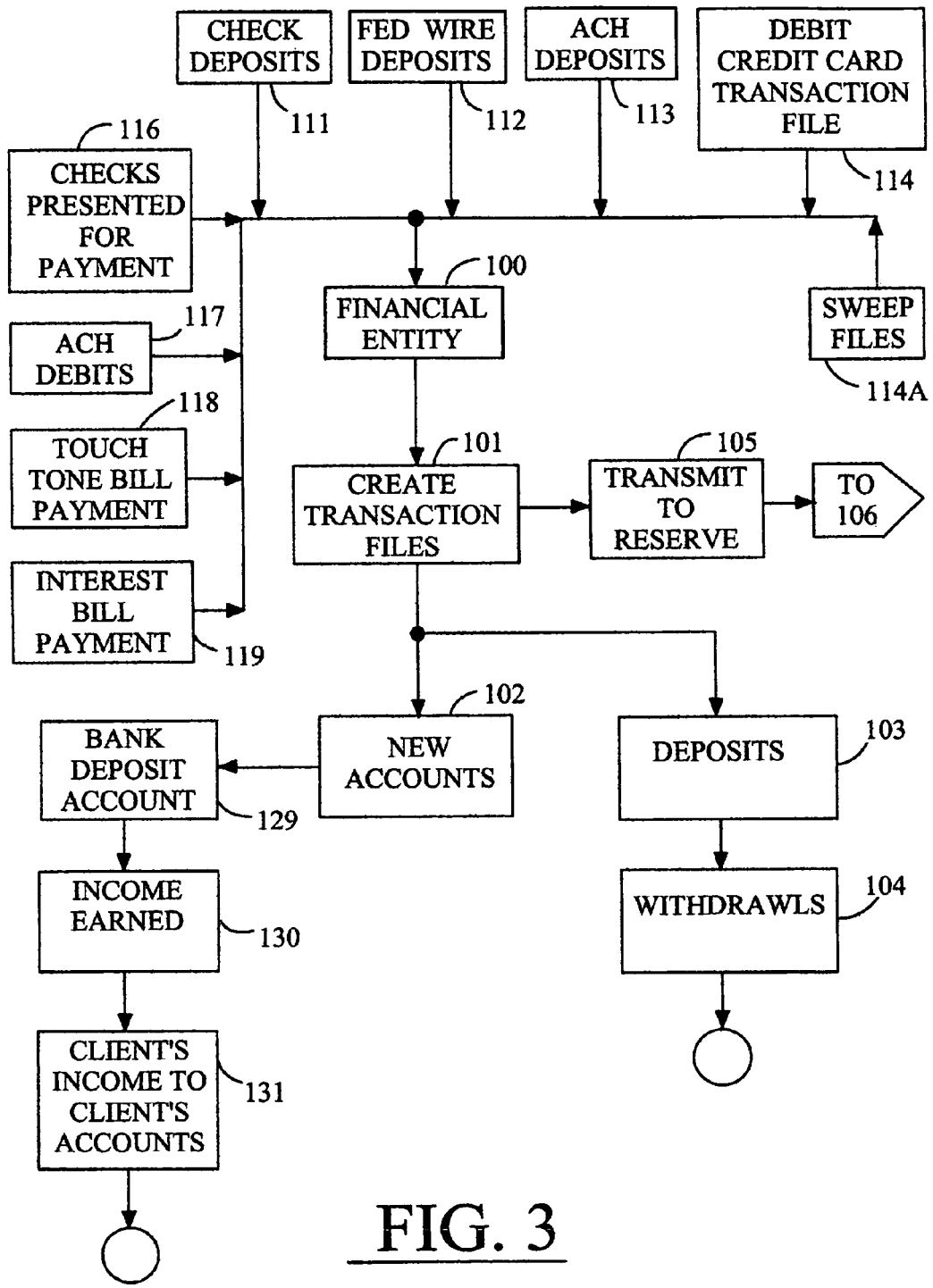
FIGS. 3-6 together comprise a flowchart depicting processing steps to be performed on behalf of an administrator pursuant to a further embodiment of the present invention.
Figure 4:
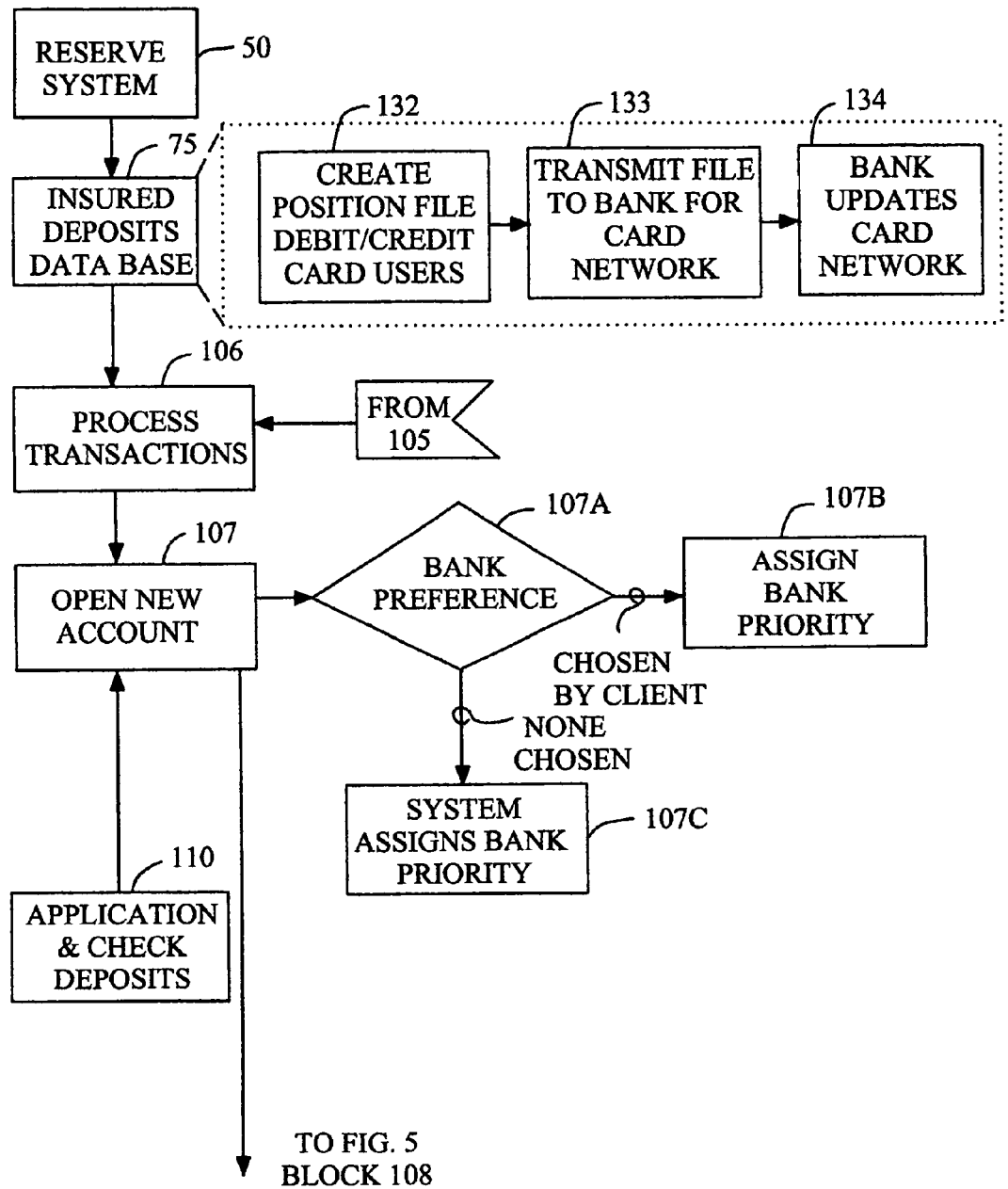

FIGS. 3 and 4 together comprise a flowchart depicting processing steps to be performed on behalf of an agent or administrator pursuant to a further embodiment of the present invention. This agent or administrator can be a brokerage firm, a bank, or another financial entity with which clients can institute financial transactions such as deposits, withdrawals and on-demand payments. The administrator or agent appears to each client as if it were, at least in part, a bank, by accepting deposits for the client's account, and, subsequently, by authorizing (and then implementing) payments demanded by the client from his or her account. The funds for all of the clients are pooled into a single deposit account that is maintained as an insured deposit account at a licensed bank or savings institution.

Referring to FIG. 3, financial entity 100 may be a bank, savings institution, brokerage firm, or other entity where financial transactions take place or can be facilitated. This financial entity 100 creates transaction files 101 which are transmitted to Reserve 105. Reserve 105 (or the Reserve System) is the administrator or other entity in charge of administering at least one of the deposit accounts. New account files 102 can be transmitted to Reserve 105. For example, a new investor account may need to be opened. This activity necessitates organizing and coordinating information to service a new investor for the present system, even though that investor may already be a client of a financial entity 100 for other investment vehicles. A new account 102 effectively becomes part of an existing pooled bank deposit account 129 that collects earned income 130, all or a portion of which is eventually conveyed to the client's accounts 131. Of course, at some point in time, the deposit account must first be established with clients' fluids. The transaction files represent the addition of funds by check (to be drawn on another institution, or to be drawn from a different demand account at the same institution), wire or electronic transfer, ACH, credits (such as from a debit or credit card merchant), or a sweep from one of the client's other accounts. Accordingly, encompassed in the transaction file are deposits 103 and withdrawals 104. A "sweep" includes the automatic transfer of funds, such as the automated transfer of interest from one account into the client's account, as well as the automated transfer of funds out of the client's account (such as for payment of a securities trade); thus, a sweep may be from one of the client's accounts to another. The responsibility for maintaining the deposit account can be assigned by the administrator to a third party.

Figure 5:
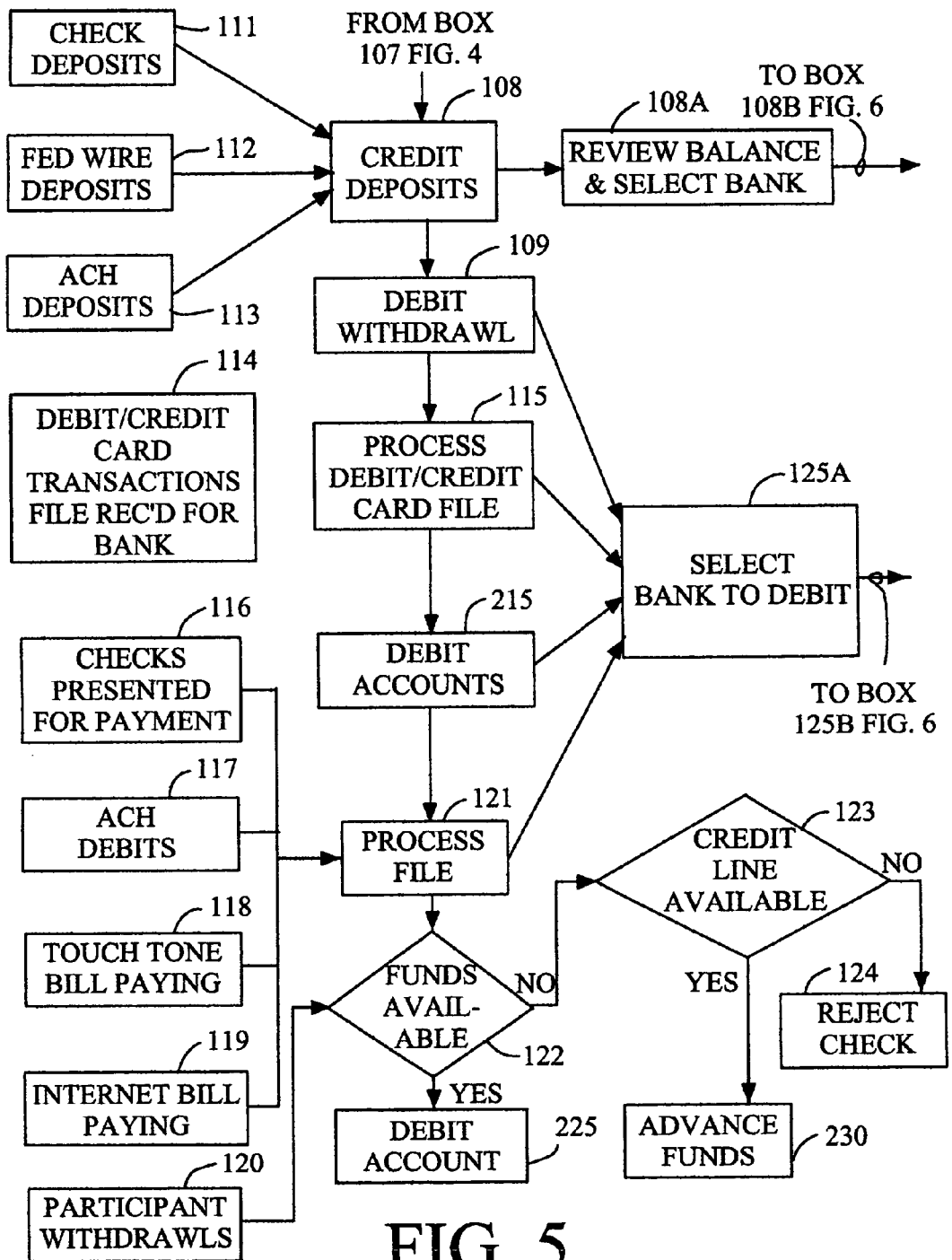
Figure 6:
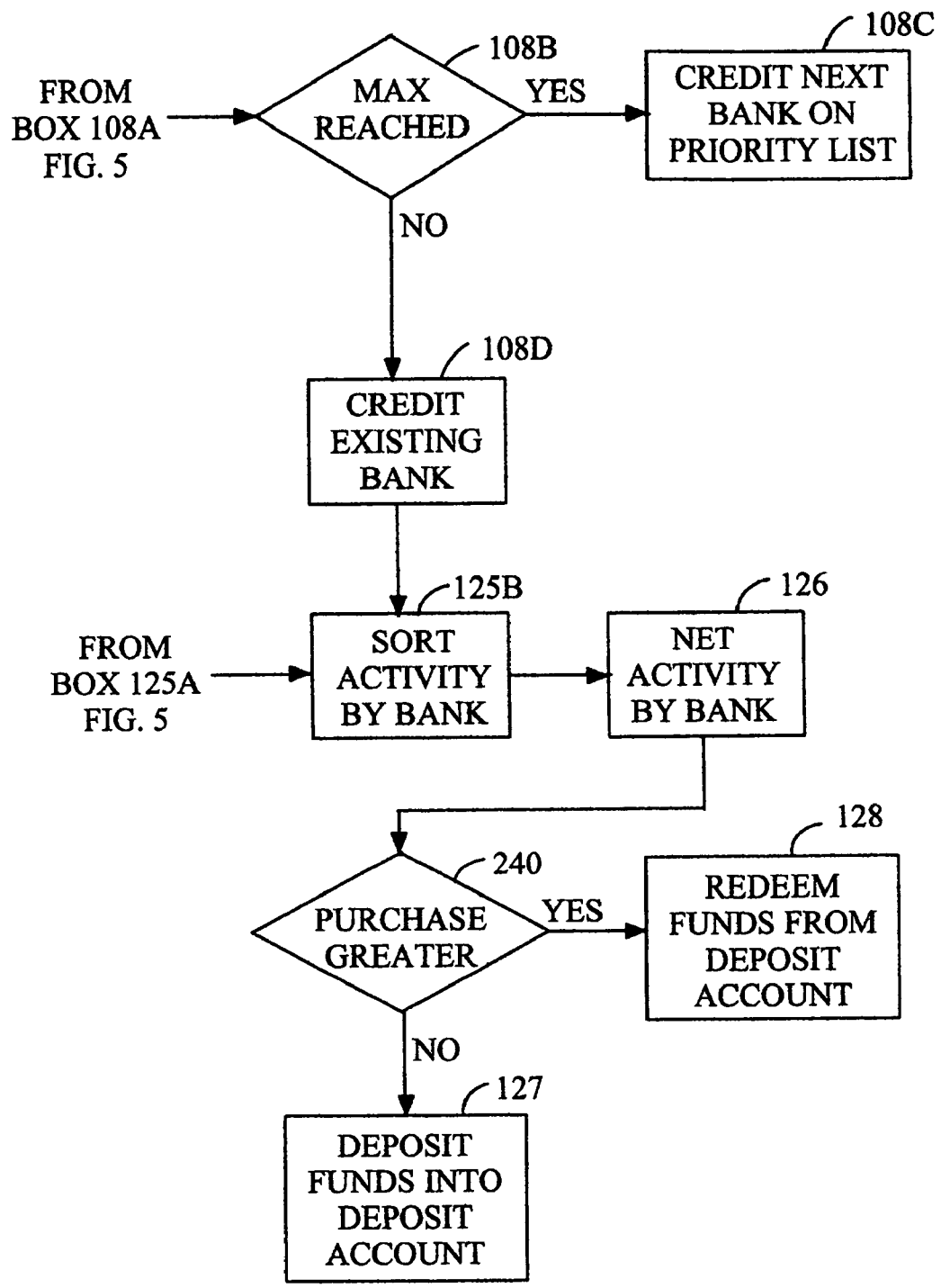

Referring now to FIG. 4, Reserve System 50 contains an insured deposit database 75 where a position file for debit/credit card users is created 132 and transmitted to a bank for a debit/credit card network 133 where the bank then updates the network 134. The system updates the data base 75 and processes transactions 106 (from 105, FIG. 3) and opens a new account 107 where application and check deposits are processed 110. The bank preference 107A is the list of banks and the order of preference for deposits and withdrawals held on the account, including a list of banks to be excluded (if any), and the maximum percentage and/or amount of funds to be held in each bank. The client's bank preference data is added to the account at 107B. If the client does not select values for any of these variables, the system can provide default values for the banks and their order at 107C sufficient for all of the client's funds. When possible, the system can be configured to assign a bank that is in the state in which the client resides. Referring to FIG. 5, it can be seen that when a deposit, either a check deposit 111, federal wire deposit 112, ACH deposit, sweep, or other deposit is credited to the client's account 108, the system will review where the existing funds of the accounts are deposited 108A. If the client's balance has reached the maximum allowable balance for the existing bank 108B, as shown in FIG. 6, the system will then select the next bank on the preference list attached to the account 108C. If the maximum allowable balance has not been reached in the existing bank, the system will credit the additional funds to that bank 108D.

Still referring to FIG. 5, the procedure for processing withdrawals can be seen. Various methods of withdrawing funds are debit withdrawal 109, processing debit or credit card transactions such as debit/credit card files 115, direct debit accounts 215, and processing of files 121. Processing of a debit/credit card file 115 utilizes data accumulated from debit/credit card transactions received from the banks 114. The processing of file 121 procedure utilizes one of various sources of data such as a check presented for payment 116, ACH debits 117, touch tone bill paying 118, and/or interne bill paying 119.

After processing the debit procedure, the system will review the bank preference list and select the appropriate bank to debit 125A. The system will sort all the daily transactions by the bank 125B (see FIG. 6). The activity for each bank will then be netted 126 and the appropriate deposit or withdrawals made.

The system will then determine whether funds are available 122, which function is also associated with other participant withdrawals 120. If the funds are available, the account is debited 225. If the funds are not available, however, the system determines whether a credit line is available 123. If a credit line is available, then funds are advanced 230 to cover the debit; if not the transaction is rejected 124.

Referring to FIG. 6, as previously stated, the system determines whether the client's balance reaches its maximum 108B. If so, the next bank on the list selected by the client is credited 108C. If the maximum is not reached, then the existing bank is credited 108D. Information and activities associated with processed debits and credits of the client's accounts from 125A are sorted by the bank 125B and the net activity by the bank is determined 126. The system then determines whether the deposits and credits were greater than the withdrawals and debits 240. If so, the excess funds are deposited into a deposit account 127. If the debits and withdrawals were greater than the credits, the difference is redeemed from the deposit account 128.

Thus, by practicing the embodiment of the invention described in connection with FIGS. 3-6, an individual client is effectively provided with FDIC insurance in excess of $100,000. This result is brought about because the individual client's holdings are maintained in multiple insured deposit accounts, which may be in multiple banks.

The foregoing description is intended to be illustrative and not limiting. Any of various changes, modifications, and/or additions may become apparent to the skilled artisan upon a perusal of this specification, and, as such, are intended to be within the scope and spirit of the invention as defined by the claims.

What is claimed is:

1. A system for managing funds for a plurality of client transaction accounts for a plurality of clients whose funds were accepted for deposit in respective client transaction accounts held in the names of the respective clients at a first banking institution, the system comprising:
   one or more electronic databases, stored on one or more computer-readable media, comprising:
      (i) client account information for each of the respective client transaction accounts;
      (ii) aggregated transaction account information for a plurality of Federal Deposit Insurance Corporation (FDIC)-insured and interest-bearing aggregated deposit accounts held in a plurality of banks in a program including the first banking institution; and
      (iii) subaccount information on each client's funds held in said plurality of the insured and interest-bearing aggregated deposit accounts; and
   one or more computers comprising memory wherein the memory stores computer-readable instructions that, when executed, cause the one or more computers to perform the steps:
      (a) accessing the electronic database and administering clients' deposits and/or transfers to and withdrawals and/or transfers from each of a plurality of said client transaction accounts, said administering step comprising processing transaction data comprising data for one or more deposits and/or transfers for one or more client transaction accounts and data for each of more than six (6) withdrawals and/or transfers by check and/or debit card within a month from each of at least two of said client transaction accounts, with the transaction data comprising a respective amount for each respective deposit and/or transfer and for each respective withdrawal and/or transfer;
      (b) determining, for one or more transaction deposits and/or transfers to a respective client transaction account held in the name of the respective client at the first banking institution, whether the balance of funds for the respective client in the aggregated deposit account at the first banking institution equals or exceeds a specified amount, and if not, then designating the first banking institution to receive the deposit and/or transfer, and if it does, determining another bank in the program and designating the deposit and/or transfer for the other bank;
      (c) determining and designating, for one or more withdrawals and/or transfers, including by check and/or debit card, from a respective client transaction account, one or more of the banks in the program for the one or more withdrawals and/or transfers;
      (d) determining, for each of a plurality of the banks in the program, one or more net transactions, with each net transaction comprising a sum of a plurality of clients' deposits and/or transfers designated for the respective bank and/or clients' withdrawals and/or transfers designated for the respective bank, from a plurality of said respective client transaction accounts of a plurality of the clients;
      (e) generating, one or more instructions to transfer funds to the respective one or more FDIC-insured and interest-bearing aggregated deposit accounts in the respective banks in the program in accordance with the respective net transactions determined for the respective banks in the program, and further comprising making a withdrawal and/or transfer from the FDIC-insured and interest-bearing aggregated deposit account held at one of the banks in the program more than six (6) times during a month, while maintaining an insured and interest-bearing status of the FDIC-insured and interest-bearing aggregated deposit account held at the one bank; and
      (f) updating or having updated, the electronic database based on the deposits and/or transfers to and withdrawals and/or transfers from the plurality of aggregated deposit accounts.

2. The system defined in claim 1, wherein one or more of the electronic databases further comprise aggregated transaction account information for a plurality aggregated demand accounts in the plurality of banks in a program, and
   wherein the computer-readable instructions further comprise instructions to facilitate the withdrawal and/or transfer of client funds from one of the FDIC-insured and interest-bearing aggregated deposit accounts at one of the banks in the program through a respective aggregated demand deposit account at the respective bank.

3. The system defined in claim 1, further comprising computer-readable instructions stored in the memory for performing the steps:
  monitoring requested debits of funds from each of a plurality of the client transaction accounts; and
  selectively authorizing or rejecting each of the requested debits based upon an account balance in a client transaction account for the client or a client's funds in the plurality of aggregated deposit accounts, or based upon both the account balance in the client transaction account for the client and the client's funds in the plurality of aggregated deposit accounts.

4. The system defined in claim 1, further comprising computer-readable instructions stored in the memory for:
  causing distribution of interest from said FDIC-insured interest-bearing aggregated deposit accounts to said client transaction accounts; and
  updating one or more of the electronic databases with client's deposits and/or transfers to and withdrawals and/or transfers from each of their respective client transaction accounts.

5. The system defined in claim 1, wherein the one or more electronic databases maintain aggregated transaction account information for a plurality of Federal Deposit Insurance Corporation (FDIC)-insured and interest-bearing aggregated deposit accounts held in a fixed number of banks in the program, and
  wherein the steps are performed using the fixed number of banks in the program.

6. The system as defined in claim 1, wherein one or more of the electronic databases includes client preference and/or exclusion information comprising a client's one or more preferences and/or one or more exclusions of one or more banks to hold its funds; and
  wherein the computer-readable instructions stored in the memory determines the other bank in the program for distribution of the deposit and/or transfer, when the balance of funds for the respective client in the aggregated deposit account at the first bank equals or exceeds the specified amount, based at least in part on the client preference and/or exclusion information.

7. The system as defined in claim 1, wherein at least one of the one or more FDIC-insured and interest-bearing aggregated deposit accounts is a money market deposit account.

8. The system as defined in claim 1, further comprising computer-readable instructions that, when executed, cause the one or more computers to perform at least four of the steps:
  receiving electronic check deposit data;
  receiving electronic Fed wire deposit data;
  receiving electronic ACH deposit data;
  receiving electronic debit card transaction files;
  receiving electronic credit card transaction files;
  receiving electronic check presentment data;
  receiving electronic ACH debit data;
  receiving electronic touch tone bill paying data;
  receiving electronic Internet bill paying data.

9. The system as defined in claim 1, further comprising computer-readable instructions that, when executed, cause the one or more computers to perform the step of receiving the client transaction data from an Internet telecommunications network.

10. A system for managing funds for a plurality of client transaction accounts for a plurality of clients whose funds were accepted for deposit in respective client transaction accounts held in the names of the respective clients at a first banking institution that includes a first bank in its infrastructure, the system comprising:
  one or more electronic databases, stored on one or more computer-readable media, comprising:
    (i) client account information for each of the respective client transaction accounts;
    (ii) aggregated transaction account information for a plurality of Federal Deposit Insurance Corporation (FDIC)-insured and interest-bearing aggregated deposit accounts held in a plurality of banks in a program including the first bank in the first banking institution and a second bank in infrastructure of a different banking institution; and
    (iii) subaccount information on each client's funds held in said plurality of the insured and interest-bearing aggregated deposit accounts; and
  one or more computers comprising memory wherein the memory stores computer-readable instructions that, when executed, cause the one or more computers to perform the steps:
    (a) accessing the electronic database and administering clients' deposits and/or transfers to and withdrawals and/or transfers from each of a plurality of said client transaction accounts, said administering step comprising processing transaction data comprising data for one or more deposits and/or transfers for one or more client transaction accounts and data for each of more than six (6) withdrawals and/or transfers by check and/or debit card within a month from each of at least two of said client transaction accounts, with the transaction data comprising a respective amount for each respective deposit and/or transfer and for each respective withdrawal and/or transfer;
    (b) determining, for one or more transaction deposits and/or transfers to a respective client transaction account held in the name of the respective client at the first banking institution, whether the balance of funds for the respective client in the aggregated deposit account at the first bank equals or exceeds a specified amount, and if not, then designating the first bank to receive the deposit and/or transfer, and if it does, determining another bank in the program and designating the deposit and/or transfer for the other bank;
    (c) determining and designating, for one or more withdrawals and/or transfers, including by check and/or debit card, from a respective client transaction account, one or more of the banks in the program for the one or more withdrawals and/or transfers;
    (d) determining, for each of a plurality of the banks in the program, one or more net transactions, with each net transaction comprising a sum of a plurality of clients' deposits and/or transfers designated for the respective bank and/or clients' withdrawals and/or transfers designated for the respective bank, from a plurality of said respective client transaction accounts of a plurality of the clients;
    (e) generating, one or more instructions to transfer funds to the respective one or more FDIC-insured and interest-bearing aggregated deposit accounts in the respective banks in the program in accordance with the respective net transactions determined for the respective banks in the program, and further comprising making a withdrawal and/or transfer from the FDIC-insured and interest-bearing aggregated deposit account held at one of the banks in the program more than six (6) times during a month, while maintaining an insured and interest-bearing status of the FDIC-insured and interest-bearing aggregated deposit account held at the one bank; and (f) updating or having updated, the electronic database based on the deposits and/or transfers to and withdrawals and/or transfers from the plurality of aggregated deposit accounts.

11. The system defined in claim 10, wherein one or more of the electronic databases further comprise aggregated transaction account information for a plurality aggregated demand accounts in the plurality of banks in a program, and wherein the computer-readable instructions further comprise instructions to facilitate the withdrawal and/or transfer of client funds from one of the FDIC-insured and interest-bearing aggregated deposit accounts at one of the banks in the program through a respective aggregated demand deposit account at the respective bank.

12. The system defined in claim 10, further comprising computer-readable instructions stored in the memory for performing the steps:

monitoring requested debits of funds from each of a plurality of the client transaction accounts; and selectively authorizing or rejecting each of the requested debits based upon an account balance in a client transaction account for the client or a client's funds in the plurality of aggregated deposit accounts, or based upon both the account balance in the client transaction account for the client and the client's funds in the plurality of aggregated deposit accounts.

13. The system defined in claim 10, further comprising computer-readable instructions stored in the memory for:

causing distribution of interest from said FDIC-insured interest-bearing aggregated deposit accounts to said client transaction accounts; and updating one or more of the electronic databases with client's deposits and/or transfers to and withdrawals and/or transfers from each of their respective client transaction accounts.

14. The system defined in claim 10, wherein the one or more electronic databases maintain aggregated transaction account information for a plurality of Federal Deposit Insurance Corporation (FDIC)-insured and interest-bearing aggregated deposit accounts held in a fixed number of banks in the program, and wherein the steps are performed using the fixed number of banks in the program.

15. The system as defined in claim 10, wherein one or more of the electronic databases includes client preference and/or exclusion information comprising a client's one or more preferences and/or one or more exclusions of one or more banks to hold its funds; and wherein the computer-readable instructions stored in the memory determines the other bank in the program for distribution of the deposit and/or transfer, when the balance of funds for the respective client in the aggregated deposit account at the first bank equals or exceeds the specified amount, based at least in part on the client preference and/or exclusion information.

16. The system as defined in claim 10, wherein at least one of the one or more FDIC-insured and interest-bearing aggregated deposit accounts is a money market deposit account.

17. The system as defined in claim 10, further comprising computer-readable instructions that, when executed, cause the one or more computers to perform at least four of the steps:

receiving electronic check deposit data;
receiving electronic Fed wire deposit data;
receiving electronic ACH deposit data;
receiving electronic debit card transaction files;
receiving electronic credit card transaction files;
receiving electronic check presentment data;
receiving electronic ACH debit data;
receiving electronic touch tone bill paying data;
receiving electronic Internet bill paying data.

18. The system as defined in claim 10, further comprising computer-readable instructions that, when executed, cause the one or more computers to perform the step of receiving the client transaction data from an Internet telecommunications network.

19. A computer-implemented method, comprising:

(a) maintaining or having maintained or accessing an electronic database, on one or more computer readable media, containing client account information for a plurality of client accounts for a plurality of clients whose funds had been accepted for deposit in the names of the respective clients at a first banking institution that includes a first bank in its infrastructure;

(b) maintaining or having maintained or accessing the same or a different electronic database, on one or more computer-readable media, containing aggregated deposit account information for a plurality of Federal Deposit Insurance Corporation (FDIC)-insured and interest-bearing aggregated deposit accounts, held in a plurality of banks of a plurality of banking institutions and including at least one FDIC-insured and interest-bearing aggregated deposit account held at the first bank in the first banking institution, wherein each aggregated deposit account hold funds of a plurality of client accounts, wherein a client account represents funds of a client held in one or more of the aggregated deposit accounts held by the banks, (c) allocating, by one or more computers, for more than one of the client accounts, the client funds from these respective client accounts, among more than one of aggregated deposit accounts, so that at least a portion of these client funds are maintained in the aggregated deposit account in the first bank and at least a portion of the client funds are maintained in an aggregated deposit account held in at least one of the banks in one of the different banking institutions;

(d) determining, by the one or more computers, client funds to be withdrawn from the FDIC-insured and interest-bearing aggregated deposit account held at one of the banks of one of the banking institutions more than six (6) times during a month while preserving an insured and interest-bearing status of the FDIC-insured and interest-bearing aggregated deposit account held at the one bank; and (e) updating or having updated, by the one or more computers, the electronic database based on the allocation of client funds to or from the plurality of aggregated deposit accounts.

20. The computer-implemented method defined in claim 19, wherein the withdrawing or having withdrawn client funds from one of the FDIC-insured and interest-bearing aggregated deposit accounts at one of the banks is through a respective aggregated demand deposit account at the respective one bank.

21. The computer-implemented method defined in claim 19, further comprising:

causing distribution of interest, by the one or more computers, from said FDIC-insured interest-bearing aggregated deposit accounts to said client accounts; and updating or having updated, by the one or more computers, one or more of the electronic databases with information about the interest distributed to said client accounts.

22. The computer-implemented method as defined in claim 19, wherein the electronic database includes client preference and/or exclusion information comprising a client's one or more preferences and/or one or more exclusions of one or more banks to hold its funds; and further comprising:
determining one or more of the different banks in the program for allocating a portion of the client's funds, based at least in part on the client preference and/or exclusion information.

23. The computer-implemented method as defined in claim 19, wherein at least one of the one or more FDIC-insured and interest-bearing aggregated deposit accounts is a money market deposit account.

24. The computer-implemented method as defined in claim 19, further comprising performing, by the one or more computers, one or more of the following steps:
accessing electronic check deposit data;
accessing electronic Fed wire deposit data;
accessing electronic ACH deposit data;
accessing electronic debit card transaction files;
accessing electronic credit card transaction files;
accessing electronic check presentment data;
accessing electronic ACH debit data;
accessing electronic touch tone bill paying data;
accessing electronic Internet bill paying data.

25. The computer-implemented method as defined in claim 19, further comprising computer-readable instructions that, when executed, allow the one or more computers to receive client data for deposits and/or transfers to and withdrawals and/or transfers from each of their respective client accounts from an Internet telecommunications network.

26. The method of claim 19, further comprising the step:
on a regular, periodic, or recurring basis, calculating or having calculated, by the one or more computers, a net transaction amount as the sum of individual client deposits and/or transfers to and withdrawals and/or transfers from each of a plurality of the client accounts; and,
utilizing, by the one or more computers, the net transaction amount to determine an amount or amounts of funds that need to be deposited into one or more of the aggregated deposit accounts to cover client deposits, or an amount or amounts of funds that needs to be withdrawn from one or more of the aggregated deposit accounts to cover client withdrawals.

27. The method of claim 19, wherein the client accounts comprise corporate client accounts.

28. A system, comprising:
(a) one or more electronic databases, stored on one or more computer-readable media, comprising:
(i) client account information for a plurality of client accounts for a plurality of clients whose funds were accepted for deposit in the names of the respective clients at a first banking institution that includes a first bank in its infrastructure,
(ii) aggregated deposit account information for a plurality of Federal Deposit Insurance Corporation (FDIC)-insured and interest-bearing aggregated deposit accounts, held in a plurality of banks of a plurality of banking institutions and including at least one FDIC-insured and interest-bearing aggregated deposit account held at the first bank in the first banking institution, wherein each aggregated deposit account hold funds of a plurality of client accounts, wherein a client account represents funds of a client held in one or more of the aggregated deposit accounts held by the banks,
(b) one or more computers comprising memory wherein the memory stores computer-readable instructions that, when executed, cause the one or more computers to access the one or more electronic databases and perform the steps:
(i) allocating, by the one or more computers, for more than one of the client accounts, the client funds from these respective client accounts, among more than one of the aggregated deposit accounts, so that at least a portion of these client funds are maintained in the aggregated deposit account in the first bank and at least a portion of the client funds are maintained in an aggregated deposit account held in at least one of the banks in one of the different banking institutions;
(ii) determining, by the one or more computers, client funds to be withdrawn from the FDIC-insured and interest-bearing aggregated deposit account held at one of the banks of one of the banking institutions more than six (6) times during a month while preserving an insured and interest-bearing status of the FDIC-insured and interest-bearing aggregated deposit account held at the one bank; and
(iii) updating or having updated, by the one or more computers, the electronic database based on the allocation of client funds to or from the plurality of aggregated deposit accounts.

29. The system defined in claim 28, wherein the computer-readable instructions further comprise instructions to facilitate the withdrawing or having withdrawn client funds from one of the FDIC-insured and interest-bearing aggregated deposit accounts at one of the banks through a respective aggregated demand deposit account at the respective one bank.

30. The system defined in claim 28, further comprising computer-readable instructions stored in the memory for:
causing distribution of interest from said FDIC-insured interest-bearing aggregated deposit accounts to said client accounts; and
updating one or more of the electronic databases with information about the interest distributed to said client accounts.

31. The system as defined in claim 28, wherein one or more of the electronic databases includes client preference and/or exclusion information comprising a client's one or more preferences and/or one or more exclusions of one or more banks to hold its funds; and
wherein the computer-readable instructions stored in the memory determine one or more of the different banks in the program for allocating a portion of the client's funds, based at least in part on the client preference and/or exclusion information.

32. The system as defined in claim 28, wherein at least one of the one or more FDIC-insured and interest-bearing aggregated deposit accounts is a money market deposit account.

33. The system as defined in claim 28, further comprising computer-readable instructions that, when executed, cause the one or more computers to perform one or more of the steps:
accessing electronic check deposit data;
accessing electronic Fed wire deposit data;
accessing electronic ACH deposit data;
accessing electronic debit card transaction files;
accessing electronic credit card transaction files;

accessing electronic check presentment data;

accessing electronic ACH debit data;

accessing electronic touch tone bill paying data;

accessing electronic Internet bill paying data.

34. The system as defined in claim 28, further comprising computer-readable instructions that, when executed, cause the one or more computers to receive client data for deposits and/or transfers to and withdrawals and/or transfers from each of their respective client accounts from an Internet telecommunications network.

35. The system as defined in claim 28, further comprising computer-readable instructions that, when executed, cause the one or more computers to perform the steps:

on a regular, periodic, or recurring basis, calculating or having calculated, a net transaction amount as the sum of individual client deposits and/or transfers to and withdrawals and/or transfers from each of a plurality of the client accounts; and, utilizing the net transaction amount to determine an amount or amounts of funds that need to be deposited into one or more of the aggregated deposit accounts to cover client deposits, or an amount or amounts of funds that needs to be withdrawn from one or more of the aggregated deposit accounts to cover client withdrawals.

36. The system as defined in claim 28, wherein the client accounts comprise corporate client accounts.

* * * * *